United States Patent
Westgate et al.

(10) Patent No.: US 8,210,223 B2
(45) Date of Patent: Jul. 3, 2012

(54) RADIAL TIRE FOR AIRCRAFT WITH SPECIFIED MERGED CORDS

(75) Inventors: Walter Kevin Westgate, Uniontown, OH (US); Yuvaraj Senthil Arumugam, Akron, IN (US); Robert John Gartland, Youngstown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 897 days.

(21) Appl. No.: 12/261,172

(22) Filed: Oct. 30, 2008

(65) Prior Publication Data

US 2010/0024948 A1 Feb. 4, 2010

Related U.S. Application Data

(62) Division of application No. 11/312,879, filed on Dec. 20, 2005, now Pat. No. 7,484,545.

(51) Int. Cl.
*B60C 9/22* (2006.01)
*B60C 9/20* (2006.01)
*B60C 9/18* (2006.01)
*B60C 9/00* (2006.01)
*D02G 3/04* (2006.01)
*D02G 3/28* (2006.01)
*D02G 3/38* (2006.01)
*D02G 3/48* (2006.01)

(52) U.S. Cl. ............ 152/527; 57/236; 57/244; 57/902; 152/451; 152/531; 152/533; 152/536

(58) Field of Classification Search .................. 152/451, 152/527, 531, 533, 536; 57/238, 244, 902; 428/222, 364, 395

See application file for complete search history.

(56) References Cited

U.S. PATENT DOCUMENTS

| | | | |
|---|---|---|---|
| 3,938,313 | A | 2/1976 | Marzocchi |
| 4,155,394 | A | 5/1979 | Shepherd et al. |
| 4,234,030 | A | 11/1980 | Van Nieuwal et al. |
| 4,244,414 | A | 1/1981 | Uemura et al. |
| 4,389,938 | A | 6/1983 | Sigrist |
| 4,832,102 | A | 5/1989 | Domchick |
| 4,893,665 | A | 1/1990 | Reuter et al. |
| 5,036,896 | A | 8/1991 | Welter et al. |
| 5,221,384 | A | 6/1993 | Takahashi et al. |
| 5,285,835 | A | 2/1994 | Ueyoko et al. |
| 5,558,144 | A | 9/1996 | Nakayasu et al. |
| 6,533,012 | B1 | 3/2003 | Jardine et al. |
| 6,601,378 | B1 | 8/2003 | Fritsch et al. |

(Continued)

FOREIGN PATENT DOCUMENTS

EP 1431076 6/2004

(Continued)

*Primary Examiner* — Adrienne C. Johnstone
(74) *Attorney, Agent, or Firm* — David L. King

(57) ABSTRACT

A pneumatic tire for use on aircraft has a tread, a crown reinforcement, and a radial carcass reinforcement having at least one axially inner ply of textile cords wound around a pair of bead cores, at least one axially inner ply being wound around the bead core in each bead from inside to the outside forming outside turn-ups and at least one axially outer ply of textile cords extending from bead to bead along the turn-ups of the at least one axially inner ply. The at least one axially inner ply or at least one axially outer ply has merged cords having a percent elongation at break of 12% to less than 20% and a break strength greater than 1050 N with a linear density of greater than 9,000 dtex. Merged cord reinforcement is preferably used in the ply layers or strips of the crown reinforcement as well.

5 Claims, 6 Drawing Sheets

U.S. PATENT DOCUMENTS

| | | |
|---|---|---|
| 6,601,626 B2 | 8/2003 | Royer et al. |
| 6,615,887 B2 | 9/2003 | Denoueix et al. |
| 6,695,025 B1 | 2/2004 | Roesgen et al. |
| 6,799,618 B2 | 10/2004 | Reuter et al. |
| 2003/0041943 A1 | 3/2003 | Ueyoko |
| 2004/0045653 A1 | 3/2004 | Ueyoko |
| 2004/0206439 A1 | 10/2004 | Roget et al. |
| 2004/0265581 A1 | 12/2004 | Esnault et al. |
| 2005/0061414 A1 | 3/2005 | Scarpitti |
| 2005/0133137 A1 | 6/2005 | Westgate et al. |

FOREIGN PATENT DOCUMENTS

| | | |
|---|---|---|
| EP | 1800902 | 6/2007 |
| GB | 2003525 | 3/1979 |

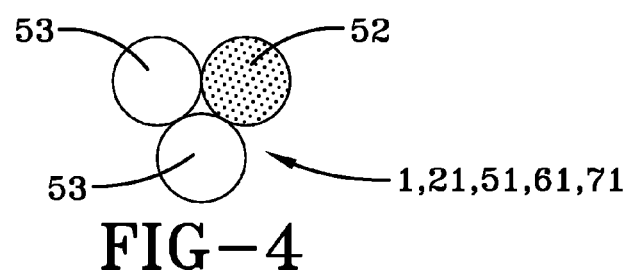
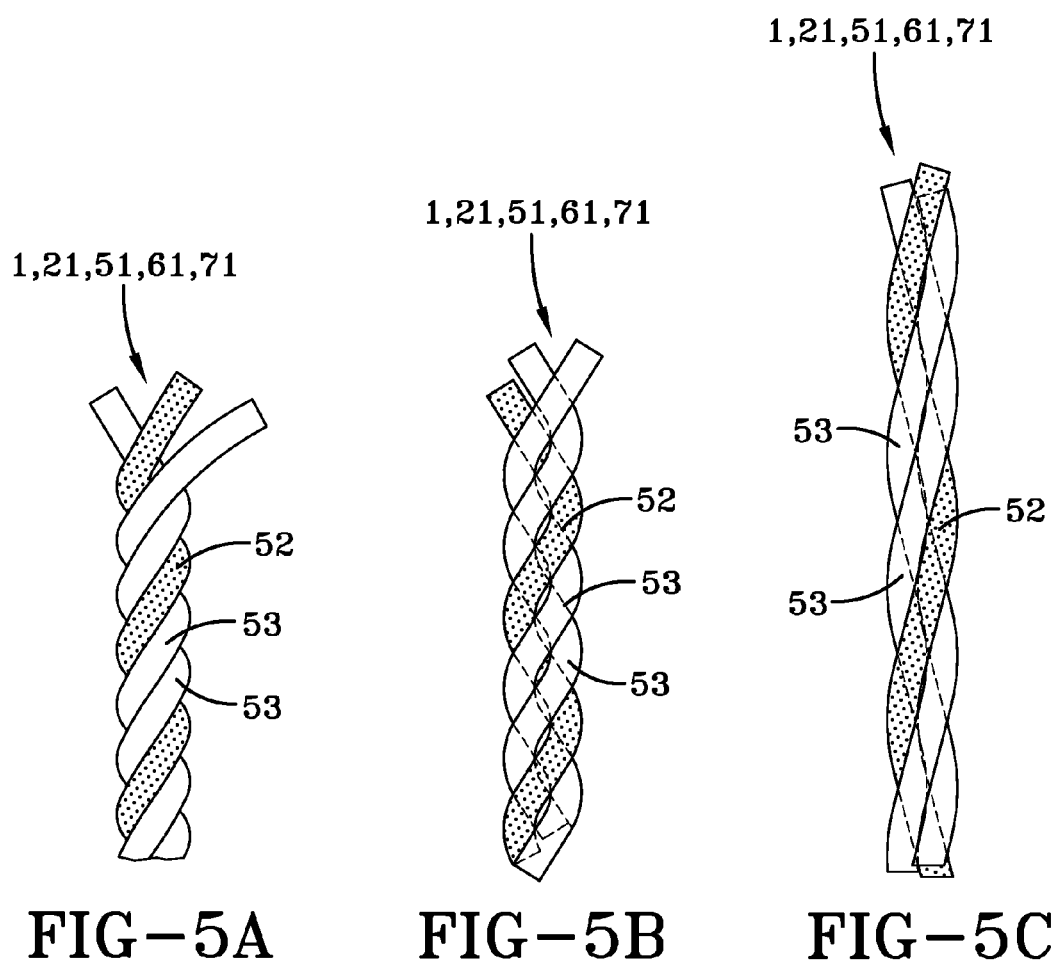
FIG-4
FIG-5A  FIG-5B  FIG-5C

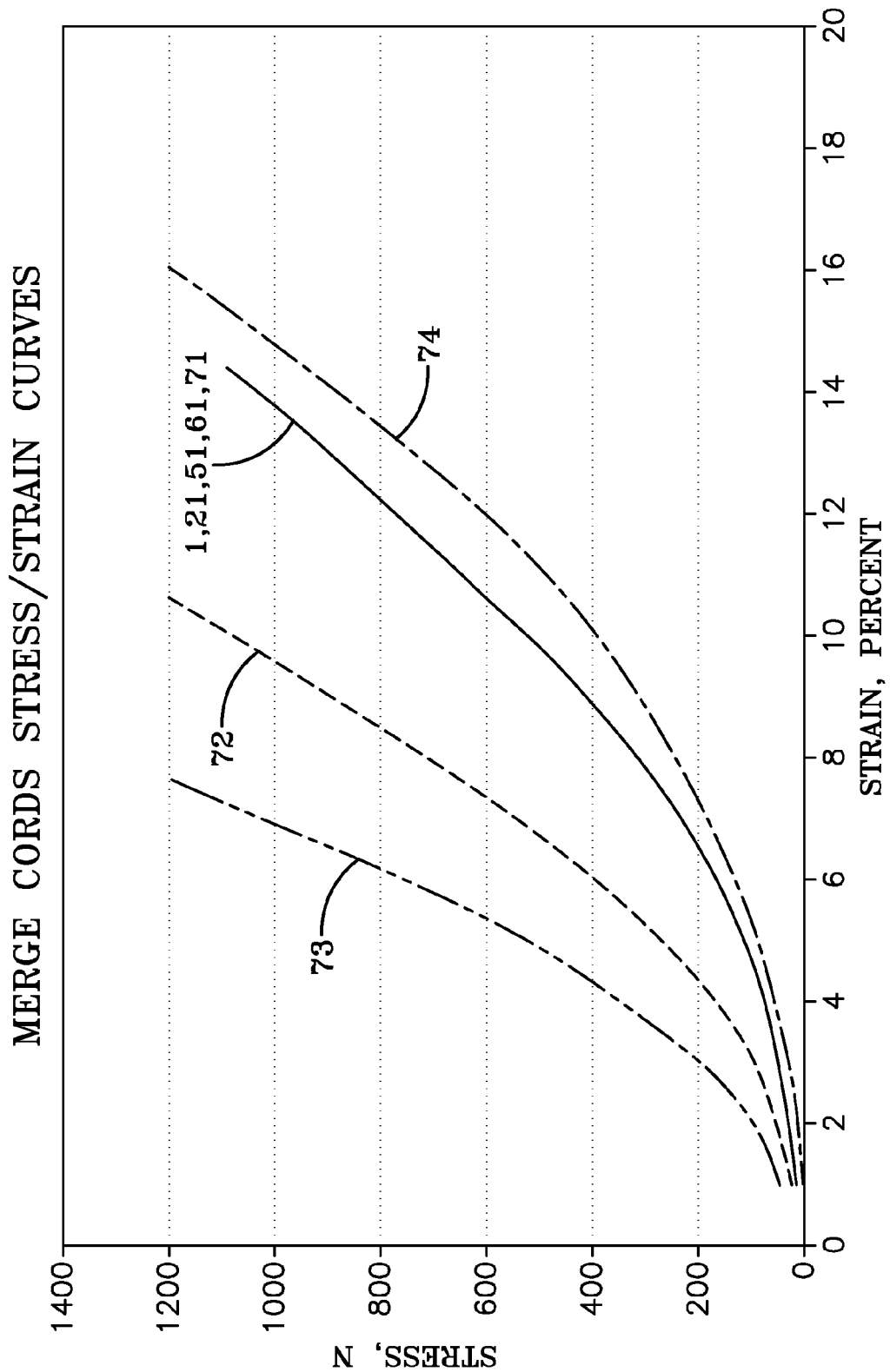

RADIAL TIRE FOR AIRCRAFT WITH SPECIFIED MERGED CORDS

RELATED APPLICATIONS

This application is a divisional application of U.S. application Ser. No. 11/312,879 entitled "Enhanced Radial Aircraft Tire" filed on Dec. 20, 2005; now U.S. Pat. No. 7,484,545 issued Feb. 3, 2009.

FIELD OF THE INVENTION

The present invention relates to a tire with radial carcass reinforcement intended to support heavy loads and inflated to relatively high pressures for high speed use, in particular an airplane tire.

BACKGROUND OF THE INVENTION

The radial carcass reinforcements of such tires generally comprise several plies of textile cords, which are anchored in each bead to at least one bead core which generally has a single bead wire. The reinforcing elements of these reinforcements are wound around said bead wire from the inside to the outside, forming turn-ups, the respective ends of which are spaced radially from the axis of rotation of the tire. The severe conditions under which airplane tires are used are such that the life of the beads is short, particularly in the area of the turn-ups of the carcass reinforcement.

A substantial improvement in performance is obtained by the separating of the plies of the carcass reinforcement into two groups. The first group comprises the plies of the carcass reinforcement which are axially towards the inside in the region of the beads, these plies being then wound around a bead wire in each bead from the inside to the outside of the tire. The second group is formed of at least one axially outer ply in the region of the beads, which ply is generally wound around the bead wire from the outside to the inside of the tire. Such arrangements are known; for instance, in U.S. Pat. No. 4,244,414.

The endurance of the beads thus constituted may be improved by the presence within each bead of an additional reinforcement ply wound around the bead wire and thus forming an axially outer strand and an axially inner strand, said reinforcement ply being the ply closest to the filling or infill rubber profiled element, which is generally triangular and radially above the anchoring bead wire. An architecture of this type is disclosed in U.S. Pat. No. 5,285,835.

Likewise a solution was proposed consisting of arranging the edge(s) of said axially outer ply (plies) between the upturns of the axially inner plies.

The endurance of the beads of aircraft tires is however in need of improvement, in particular when said beads are subjected to great overloads which may impart thereto loadings causing deflections of the order of 50% of their height and more. The progress to be expected of development of the architecture of the beads would seem, at least at present, to be fairly limited, owing to the very fact of the necessary number of carcass plies, generally formed of reinforcement elements of aliphatic polyamide, in order to withstand the tension due to what is called the test pressure which, as is known, must be equal to four times the operating pressure. The large number of said carcass plies obviously involves the multiplication of the free ends of reinforcement elements, the multiplication of the interfaces between plies, greater hysteresis losses and therefore higher operating temperatures, all of which are factors favorable to increasing the fatigue of the beads and limiting their endurance.

A proposed solution is to improve the endurance of the beads of an aircraft tire lies in the replacement of the carcass plies of aliphatic polyamide by carcass plies formed of composite reinforcement elements, that is to say ones formed of yarns of different moduli as is disclosed in US patent Application US 2004/0206439.

In accordance with the aircraft tire of US 2004/0206439, inflated to high pressure, having a tread, a crown reinforcement and a radial carcass reinforcement, this radial carcass reinforcement comprised a plurality of textile reinforcement elements oriented substantially radially (that is to say forming an angle of between 80.degree. and 100.degree. with the circumferential direction), this tire was characterized in that the radial reinforcement elements of the carcass reinforcement are composite cables formed by plying at least one yarn having a modulus of elasticity in tension at least equal to 2000 cN/tex, with at least one yarn having a modulus of elasticity upon traction at most equal to 1500 cN/tex, said elasticity moduli of said yarns being measured for a tensile force equal to ten percent (10%) of the breaking load of each yarn in question. Similarly the crown reinforcement may use these cables.

Pneumatic aircraft tires are a composite of at least two primary materials: elastomer and fibers. The materials are combined to produce rubberized fibers used as reinforcement in the tire. The most common fibers in tires generally are polyester, rayon and nylon and aircraft tires also use aromatic polyamide or aramid all of which are formed into cords prior to being incorporated into elastomers. The fiber cords give a tire its shape, size, stability, load carrying capacity, fatigue and bruise resistance, to name a few characteristics.

Fiber cords are used in all the different areas of the tire where reinforcement means are required: in the carcass as a reinforcing ply for the entire carcass or in sidewall regions; in the belt or breaker structures as primary reinforcing plies or as overlays or underlays; in the bead region as flipper or chipper plies. In the different areas of the tire, the fiber cord is relied upon to provide properties specific to that region of the tire. Thus, for each area of the tire, a single type of fiber may be treated or corded in numerous ways to provide different benefits.

Prior to being incorporated into elastomer, the fiber cord is adhesively treated to ensure bonding of the fiber to the elastomer. The selected adhesive is determined so as to be compatible with the fiber being used and to permit the fiber to remain bonded to the elastomer during curing and use of the tire. An adhesive selected for use with nylon fibers will not be compatible with polyester fibers due to the different chemical structure of the adhesive and the fiber.

In treating the fiber, there are three main variables to consider: time, temperature, and tension. Each of these variables is optimized depending upon the type of fiber cord being treated, i.e. nylon versus rayon versus aramid, and the adhesive being used to create bonding between the elastomer and fiber. The time must be sufficient to allow the adhesive to bond with the fiber and set; the temperature must be sufficient to activate the adhesive; and the tension must be sufficient to ensure penetration of the adhesive, permit the fiber to move through the processing unit, and develop the requisite physical properties such as modulus, shrinkage and extensibility that are required.

In selecting a fiber cord for reinforcing a tire, the cord properties are selected to achieve desired goals. When different properties are desired and a single fiber type cannot provide the desired characteristics to the tire, different materials may be combined. A reinforcement ply may use alternating types of parallel cords.

Core/sheath types of filaments are also known. In a conventional core/sheath type of filament, such as that disclosed by U.S. Pat. No. 5,221,384 (Takahashi), the sheath is a polyamide sheath and a polyester core, with a sheath/core cross-sectional ratio of 90:10 to 10:90 down to 70:30 to 30:70. In such a cord, one skilled in the art recognizes that a true core/sheath filament exists by the resultant properties of the filament. For example, if the Takahashi filament is 10% sheath of polyamide and 90% core of polyester, the resulting properties typically follow the rules of a mixture whereby the 10% of one property of the polyamide is added to 90% of the property of the polyester. A core/sheath filament is formed through high speed spinning wherein the two different materials are spun through nested openings in the spinneret and taking advantage of die swell for the two different materials to contact and bond during orientation of the filament.

The invention of US 2005/10133137 was directed to a blended fiber cord used for reinforcing tires and pneumatic tires comprising such cords. The cords, in combination with a preferred adhesive, achieved a high degree of thermal stability allowing for the use of such cords in various reinforcing plies for a pneumatic tire and for preferred use for such cords in areas of the tire subjected to high temperatures either in curing or performance.

The object of the present invention is to achieve superior cord extensibilities while meeting the required strength performance for the severe load and deflection requirements of radial aircraft tire designs.

Unlike the tire of the US publication 2005/0133137 which employed a blended aramid and polyester cord intended primarily for use in a passenger runflat tire or agricultural tire, the present invention employs a unique merged cord employing aramid or aromatic polyamide fibers and nylon or aliphatic polyamide fibers in an aircraft tire as described below.

SUMMARY OF THE INVENTION

This invention discloses a pneumatic tire for use on aircrafts having a tread, a crown reinforcement, and a radial carcass reinforcement. The carcass reinforcement has at least one axially inner ply of textile cord wound around a pair of bead cores, at least one axially inner ply being wound around the bead core in each bead from inside to the outside forming outside turn-ups and at least one axially outer ply of textile cords extending from bead to bead along the turn-ups of the at least one axially inner ply. Each bead has an elastomeric apex filler. At least one axially inner ply or at least one axially outer ply has merged dipped cords having a percent elongation at break of 12% to less than 20% with a linear density of greater than 9,000 dtex and a break strength greater than 1050 N, preferably a greige cord having a percent elongation at break of 14% to 16% with a linear density of greater than 9,500 dtex at a break strength greater than 1050N. The preferred cord has fibers of aromatic polyamide and nylon. The cord fiber of aromatic polyamide is an aromatic polyamide of two plies of 3300 dtex construction combined with one ply of aliphatic polyamide or nylon of 1880 dtex. The preferred cord twist construction is 6.7 Z (A)+4.5 Z (N)/6.7 S TPI. The cord reinforcement is preferably used in the ply layers or strips of the crown reinforcement, and can also be used in the flipper, chipper and any other cord reinforced element of the tire as well.

A method of manufacturing the merged cord of the invention includes the steps of: constructing a merged cord of two plies of aromatic polyamide and one ply of aliphatic polyamide having a greige low elongation capability in the range of 6% to 15% and a dipped high elongation at least 20% higher than the value of the greige merged cord, wherein the greige merged cord has a percent elongation of 10% to 15%.

DEFINITIONS

The following definitions are controlling for the disclosed invention.

"Apex" means an elastomeric filler located radially above the bead core and between the plies and the turnup ply.

"Annular" means formed like a ring.

"Aspect ratio" of the tire means the ratio of its section height (SH) to its section width (SW) multiplied by 100% for expression as percentage.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Chafers" refers to narrow strips of material placed around the outside of the bead to protect cord plies from the rim, distribute flexing above the rim, and to seal the tire.

"Chippers" means a reinforcement structure located in the bead portion of the tire.

"Circumferential" means lines or directions extending along the perimeter of the surface of the annular tire parallel to the Equatorial Plane (EP) and perpendicular to the axial direction.

"Cord" means one of the reinforcement strands of which the plies of the tire are comprised.

"Cord angle" means the acute angle, left or right in a plan view of the tire, formed by a cord with respect to the equatorial plane. The "cord angle" is measured in a cured but uninflated tire.

"Denier" means the weight in grams per 9000 meters (unit for expressing linear density). Dtex means the weight in grams per 10,000 meters.

"Elastomer" means a resilient material capable of recovering size and shape after deformation.

"Equatorial plane (EP)" means the plane perpendicular to the tire's axis of rotation and passing through the center of its tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" means a reinforced fabric wrapped about the bead core.

"Greige" means unfinished cord or fabric.

"Inner" means toward the inside of the tire and "outer" means toward its exterior.

"Innerliner" means the layer or layers of elastomer or other material that form the inside surface of a tubeless tire and that contain the inflating fluid within the tire.

"LASE" is load at specified elongation.

"Lateral" means an axial direction.

"Lay length" means the distance at which a twisted filament or strand travels to make a 360° rotation about another filament or strand.

"Merged cord" means a cord constructed by helically twisting together a plurality of individual yarns, at least one of the individual yarns being of a material different from the material of at least one of the other individual yarns.

"Ply" means a continuous layer of rubber-coated parallel cords in the context of a tire and also means a twisted yarn in a context of a yarn or a cord as used herein the meaning is dependant on the context.

"Polyester" means any polymer synthesized from the polycondensation of a diol and a dicarboxylic acid.

"Radial" and "radially" are used to mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height (SH)" means the radial distance from the nominal rim diameter of the tire at its equatorial plane.

"Sidewall" means that portion of a tire between the tread and the bead.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Tread" means a molded rubber component which, when bonded to a tire casing, includes that portion of the tire that comes into contact with the road when the tire is normally inflated and under normal load.

"Twisted", means the number of turns about its axis per unit of length of a yarn, turns per inch being TPI.

"Yarn" occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

BRIEF DESCRIPTION OF THE DRAWINGS

The invention will be described by way of example and with reference to the accompanying drawings in which:

FIG. 4 is a cross sectional view of a merged cord of the present invention.

FIGS. 5A, 5B, 5C are plan views of the cord of FIG. 4.

FIG. 7 is a chart showing the stress/strain curves of greige cords of the present invention compared to other greige cord constructions.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
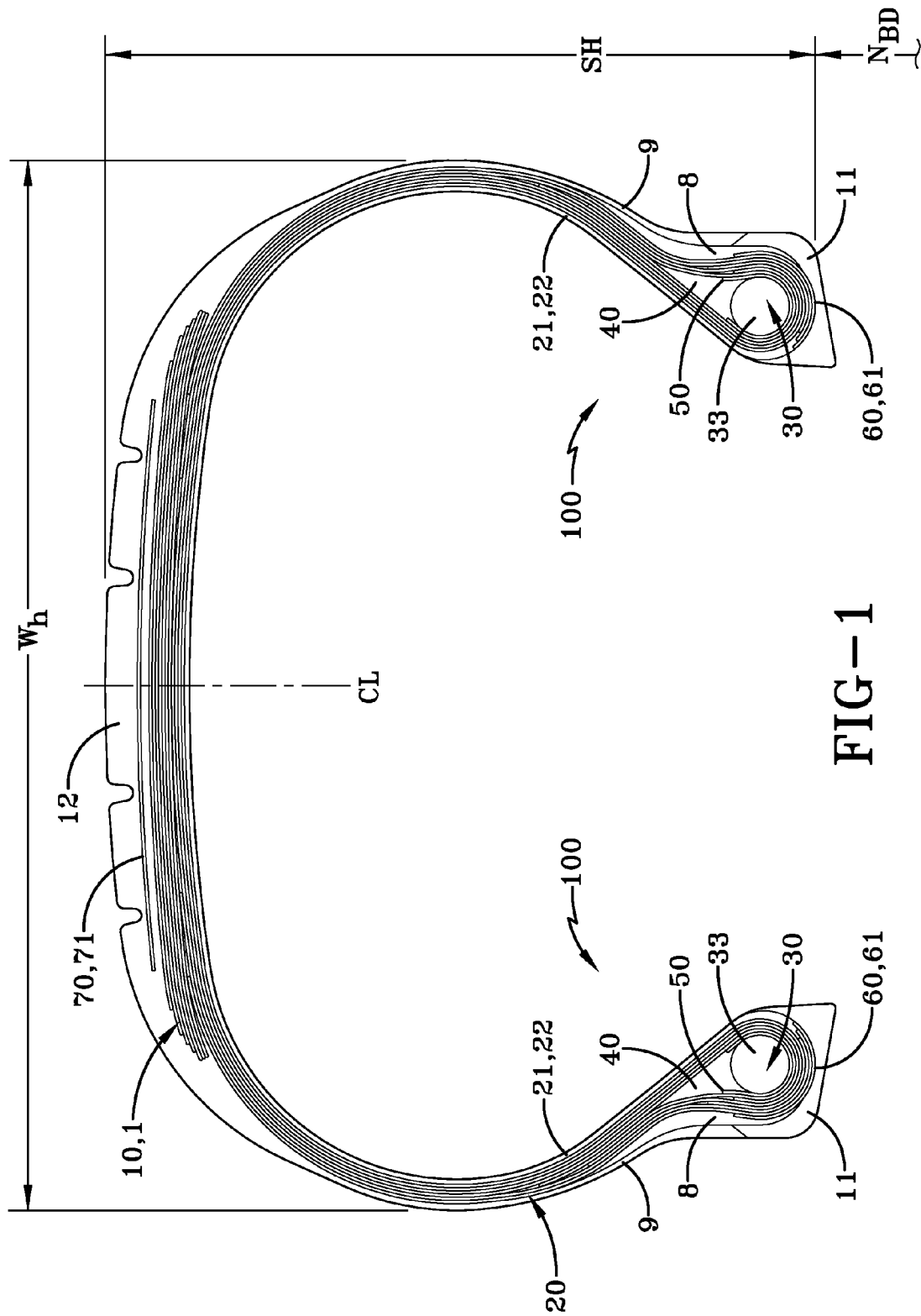
FIG. 1 is a cross sectional view of a pneumatic tire.

FIG. 1 illustrates an exemplary aircraft tire 100 according to the present invention. The tire 100 has a tread 12 with sidewall portions 9 connected to and extending from the lateral edges of the tread 12. At the radially inner ends of each sidewall 9 is a bead portion 30. Each bead portion 30 has therein a bead core 33, an apex 40 extending radially outward from the bead core 33, and may have at least one reinforcing chafer layer 60 reinforced with cords 61 to reduce rim chafing of the tire. A carcass reinforcing ply structure 20 extends from one bead portion to the opposing bead portion with turnup portions as shown.

Figure 2:
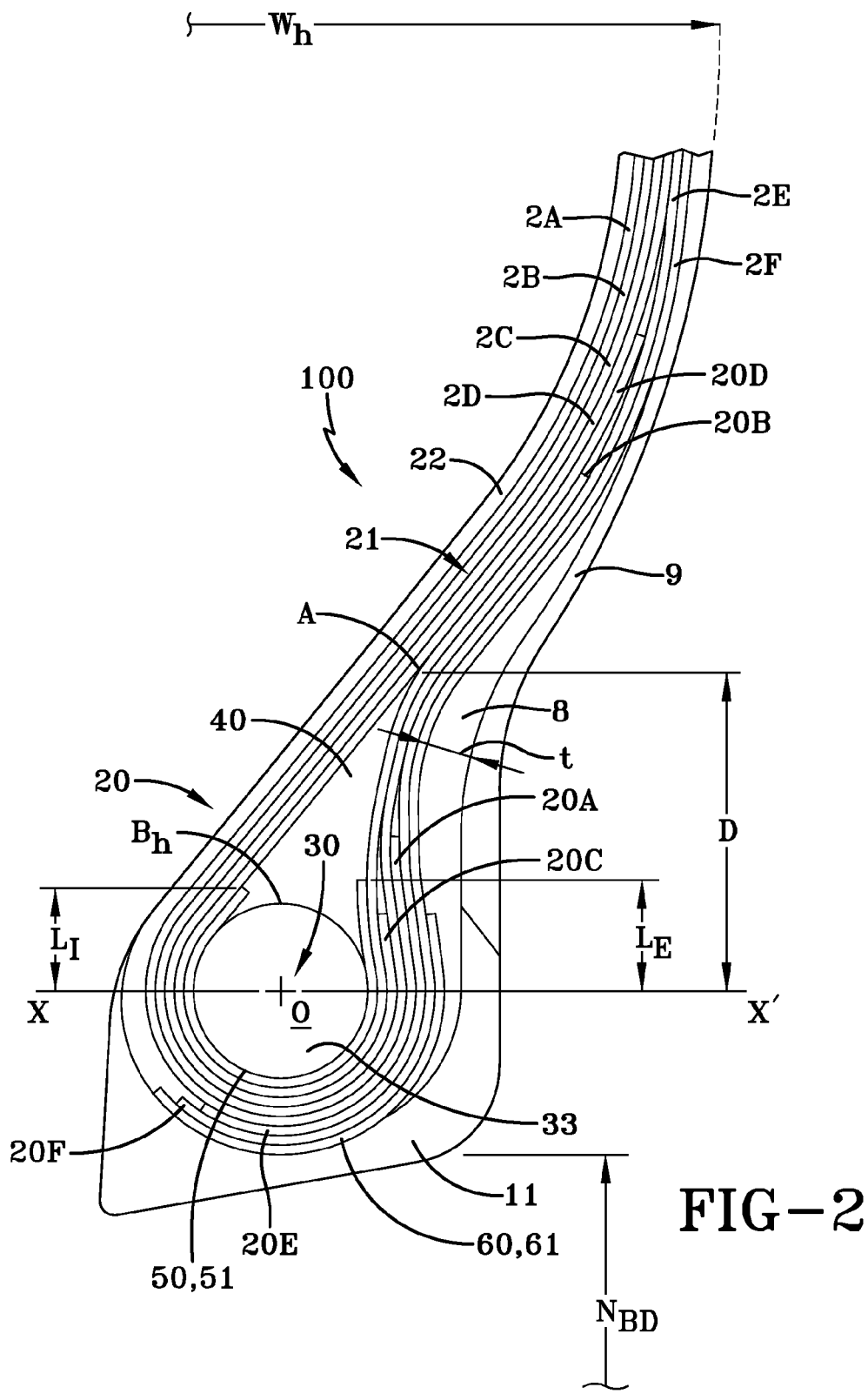
FIG. 2 is a cross sectional view of bead of the tire of FIG. 1.
Figure 3:
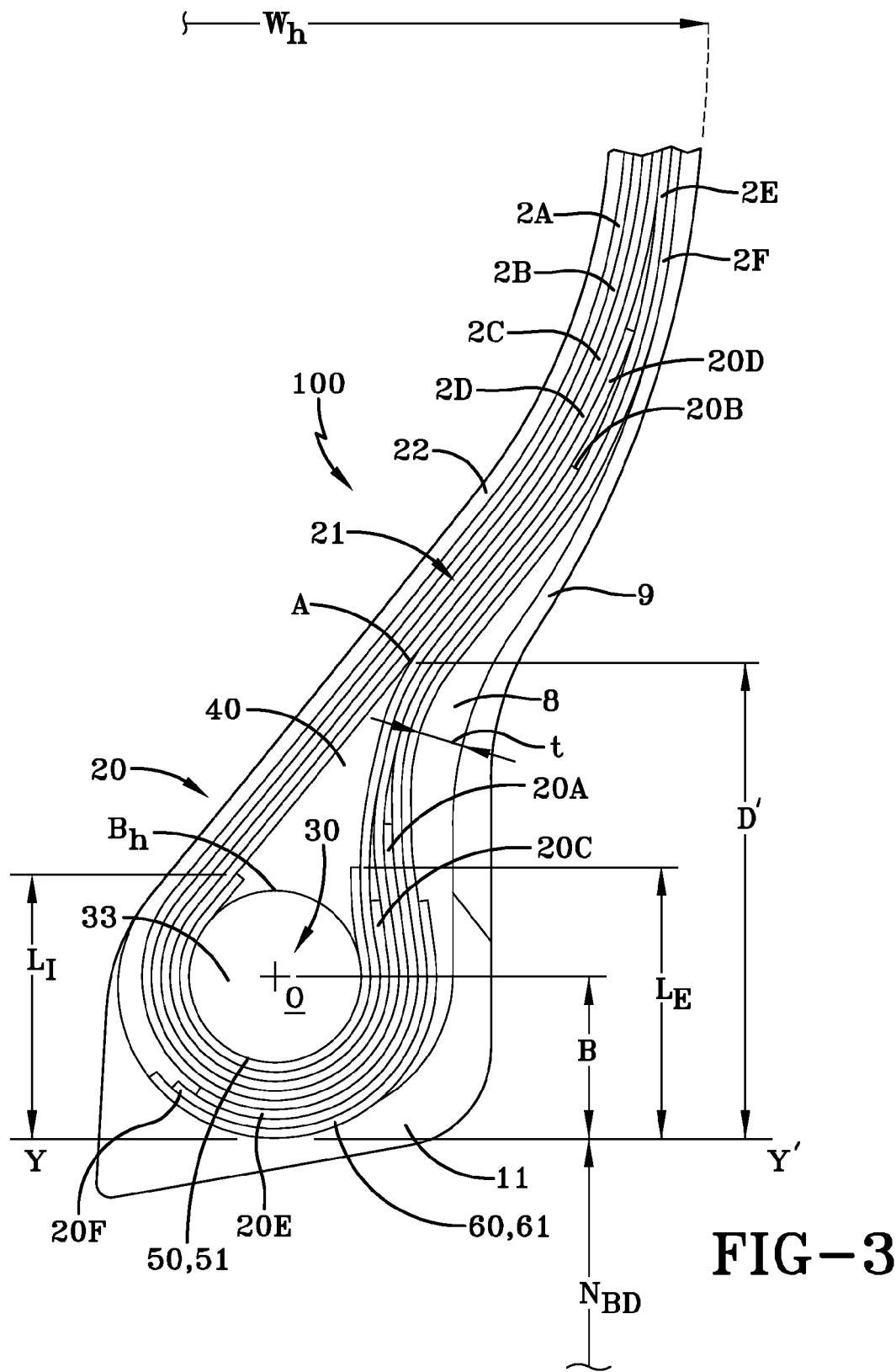
FIG. 3 is an additional view of the bead of FIG. 2.

In greater detail, the exemplary tire 100 of the present invention is illustrated in a diagrammatic view in cross-section FIGS. 2 and 3.

With reference to FIGS. 2 and 3, the carcass reinforcement 20 is formed of six plies 2A to 2F of radial textile cords 21. Among these six plies, four axially inner plies 2A, 2B, 2C and 2D are wound in each bead around a bead core 33 shown in the drawing having circular cross section. These four plies extend from the inside to the outside of the tire in order to form turn-ups 20A, 20B, 20C and 20D. The carcass reinforcement is radially outward of the innerliner 22 of tire 100.

Outward of the bead core 33 is a strip or filler 40 of elastomeric material having a substantially triangular shape extending to an apex A radially furthest from the axis and located a distance D from a reference line XX'. As was shown in FIG. 1 the reference line is also parallel to the axis of rotation and through the geometric center O, of the circle circumscribed on the cross section of the bead core 33.

A flipper 50, which can be formed of radial textile cords 51 similar to those of plies 20, is located with an inner end $L_I$ slightly above the height $B_h$ of the bead core 33 and an outer end $L_E$ is also shown slightly above the bead core 33 as measured from line YY'. The ends $L_I$, $L_E$ satisfy a relationship wherein $B_h < L_I$ and $L_E < 0.7D$ as measured from the nominal bead diameter $N_{BD}$. To minimize the space occupied by the flipper 50 the cords 51 can be made of a diameter smaller than the ply cords 21.

The carcass further has two carcass plies 2E and 2F herein called outer plies. These outer plies cover the turn-ups 20A through 20D of the inner plies 2A through 2D. The plies 2E and 2F are wound around the bead core 33 over a portion of the circular arc at least past the center of bead core 33 on the radially inner portion. The ply ends 20E and 20F are thus axially inward of the lowest portion of the bead core 33. The ends 20E and 20F are these effectively pinched between the bead core 33 and the rim seat helping to securely anchor these outer plies 2E and 2F.

The tire bead may have an outer chipper 60 of textile cords 61 as shown wrapped around the ends 20E and 20F assuring protection of the carcass plies against injury during mounting. Preferably radially below the chipper 60 is a chafer 11 having a rubber gauge 11 in the range of 0.04 inches (1.0 mm) to about 0.16 inches (4.1 mm).

Axially outward of the chafer and the plies 20E and 20F is an elongated strip 8 of elastomeric material extending from radially inward of the bead adjacent the chafer to a radial location at or slightly above the turn-up 20B but below the turn-up 20D. As shown, this strip 8 is interposed between the sidewall rubber 9 and the outer ply 20F. At a location almost equal to the radial height D of the apex A, the strip 8 has a maximum thickness t. In the tire size shown the maximum thickness t is 0.3 inches—(7.6 mm).

Referring back to FIG. 1, outward of the carcass is a belt structure 10. The belt structure 10 has at least two ply layers of cords 1, the cords 1 being inclined at an angle of 5 to 35 degrees. The cords 1 in each ply layer are parallel to each other and crossed relative to the cords 1 in the adjacent layer. The radial carcass reinforcement is radially surmounted by the crown reinforcement or belt structure 10 formed of a plurality of layers of textile reinforcement elements or cords 1 which are inclined relative to the circumferential direction by a certain angle α. So as to avoid the free ends of crown plies, said layers are obtained by winding, around a form, whether cylindrical or rounded, or a carcass reinforcement blank, a strip of at least one textile reinforcement element or cord 1 from one edge of the layer to the other, forming the desired angle with the equatorial plane.

The known textile elements or cords commonly used are of aliphatic polyamide, and have relatively poor tensile strength characteristics, which is why numerous plies are used. As for numerous tires, the attempted use of aromatic polyamide or other similar material as material for reinforcing the crown reinforcement or belt structure may prove advantageous in an aircraft tire, owing to the properties of said material. However, it is not easy to use such a material, and its use has numerous problems. For example, it is virtually impossible to use it in a crown reinforcement such as described above, obtained by winding a strip in a zigzag: the curvatures adopted by the strip, and hence by the reinforcement elements at the edge of the layer, impart to said elements very major tensions and compressions which, combined with the fact that the aromatic polyamide has resistances to said stresses.

A crown reinforcement, with aromatic polyamide plies, the edges of which are folded over on themselves, is also scarcely conceivable owing to the curvatures and adhesion to the rubber which is inferior to that of an aliphatic polyamide.

The cords 1 of the present invention are constructed to permit the use of aromatic polyamide as a suitable material for the main reinforcement elements of a crown reinforcement or belt structure 10, by adapting the architecture of said reinforcement by a unique merging of cord materials as is described below.

As shown in FIG. 1, the belt structure 10 also includes an overlay ply 70. The overlay ply 70 is illustrated as being located radially outward of the belt plies 10, but such a ply may be located radially inward of the belt plies 10 or between the plies 10. The overlay ply 70 is formed of cords 71 inclined at about 5 to 10 degrees relative to the equatorial plane of the tire. The inclination angle of the cords is partially dependent upon the formation and application method of the overlay ply. The overlay ply 70 may be spirally wound onto the tire building machine—with spiral winding of a single elastomeric encased cord or an elastomeric ribbon of multiple cords having a width of 5 to 30 mm and a cord density in the range of about 10 to about 50 ends per inch (25.4 to 130 end per cm). The overlay ply 70 may also be a cut ply of parallel cords 71. A spirally wound layer will have a greater inclination angle relative to the equatorial plane than a cut ply of parallel cords.

Each of the elements described above can employ the textile cords 1, 21, 51, 61 or 71 of the present invention including the carcass plies 20 the belt ply 10 or strips, the chafer 60 the flipper 50 or the overlay 70.

With reference to FIGS. 4, 5A, 5B and 5C merged cords according to the present invention are shown.

Referring to FIG. 5A, there is shown an unstretched cord of any of cords 1, 21, 51, 61 or 71 (hereinafter simply referred to as cord 51) of helically cabled dissimilar yarns having a twist of about seven Z turns per inch comprised of two yarns of aramid 52 having no residual twist and about five Z turns per inch of one yarn of nylon 53 having a residual twist of 2.0 turns per inch based on about 7 S turns per inch of twist in the cord. In FIG. 5B, as the cord 51 is initially stretched, the load is primarily shared by both the aramid plies 52 and the nylon ply 53 as they elongate by stretching in an axial fashion. In FIG. 5C, as the cord 51 is stretched further in the longitudinal direction, the nylon ply 53 continues to elongate by stretching, until the aramid plies 52 essentially reaches its limit of is elongation and then becomes the principal load-bearing member of the cord 51.

The aircraft tire construction is merely one example of a carcass construction adapted for very heavy loads under extreme deflections. Variations in both number of plies and use of flippers, chafers and optimal locations of ply endings can be varied based on the specific application. The present invention is directed to the specialized textile cords 21 made in accordance to the present invention and is designed for use in such aircraft tires.

As used herein, "aramid" and "aromatic polyamide" are both understood to mean a manufactured fiber in which the fiber-forming substance is generally recognized as a long chain synthetic aromatic polyamide in which at least 85% of the amide linkages are attached directly to the two aromatic rings. Representative of an aramid or aromatic polyamide is a poly (p-phenyleneterephtalamide). Nylon is understood to be an aliphatic polyamide 6.6, 6 or 4.6.

In a cord, each of the yarns has its component filaments twisted together a given number of turns per unit of length of the yarn (usually expressed in TPI) and additionally the yarns are twisted together a given number of turns per unit of length of the cord. Once twisted the yarns are commonly refereed to as plies. The direction of twist refers to the direction of slope of the spirals of a yarn or cord when it is held vertically. If the slope of the spirals conforms in direction to the slope of the letter "S", then the twist is called "S" or "left hand". If the slope of the spirals conforms in direction to the slope of the letter "Z", then the twist is called "Z" or "right hand". An "S" or "left hand" twist direction is understood to be an opposite direction from a "Z" or "right hand" twist. "Ply twist" is understood to mean the twist imparted to a yarn before the yarn is incorporated into a cord, and "cord twist" is understood to mean the twist imparted to two or more yarns when they are twisted together with one another to form a cord. "dtex" is understood to mean the weight in grams of 10,000 meters of a yarn before the yarn has a twist imparted thereto.

The merged cords 1, 21, 51 or 61 of aramid and nylon in the preferred embodiment had a 3300/2+1880/1 (N) dtex, twisted 6.7Z/4.5Z/6.7S (meaning that two yarns 53 of 3300 dtex aramid are each twisted 6.7 TPI in the Z direction, one yarn 52 of nylon is twisted 4.5 TPI in the Z direction and the three yarns receive a cord twist of 6.7 TPI in the S direction).

Comparison cords 73 were evaluated using a hybrid core insertion of aramid K29/nylon 66 having a 3300/3 Z/940/1 dtex, twisted 7Z/0/7.0S construction and a competitor cord 72 construction of aramid K29/nylon 66 having a 3300/2Z/1880/N dtex twisted 5.8Z/5.8Z/5.8S.

Figure 6:
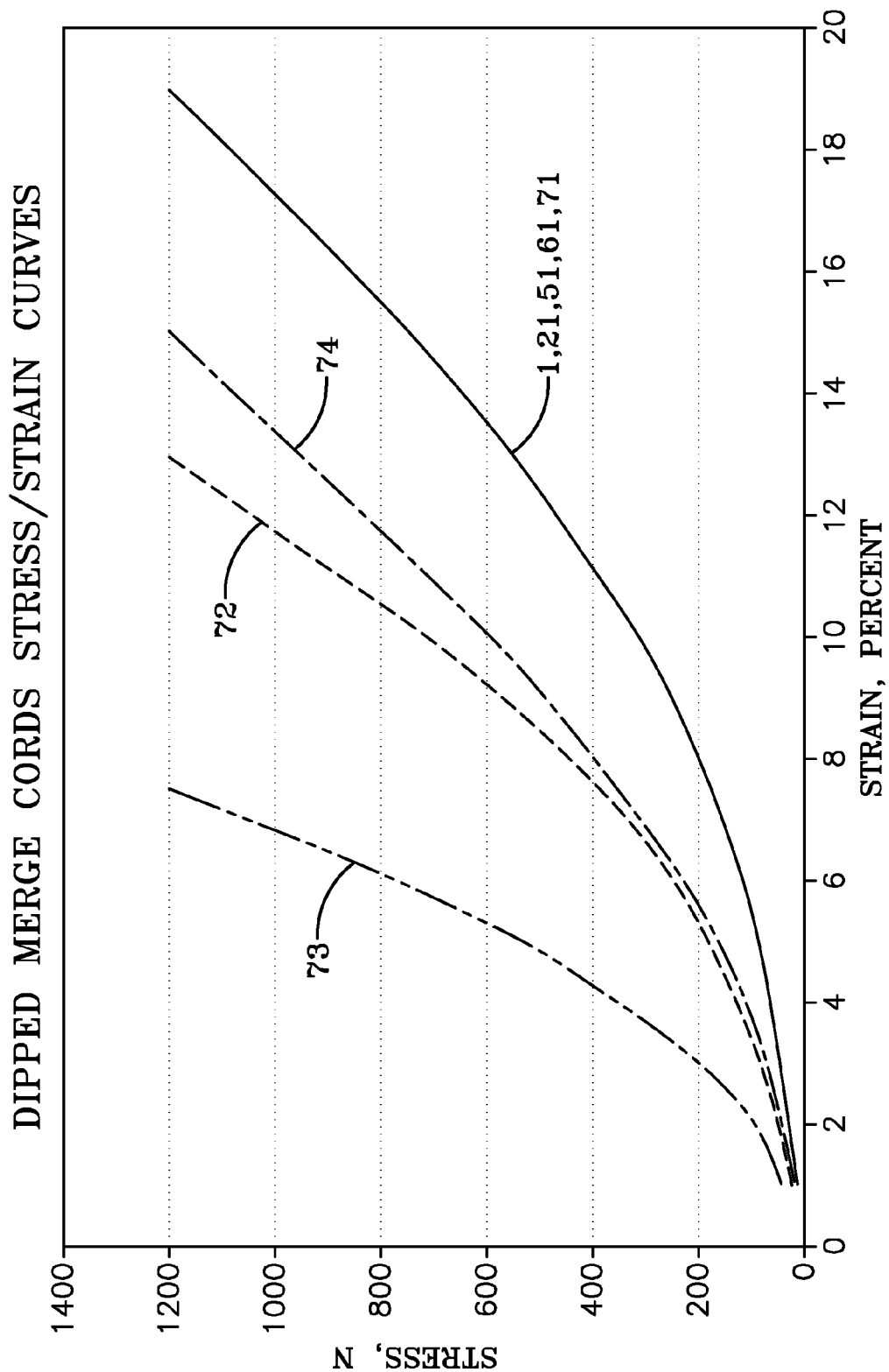
FIG. 6 is a chart showing the stress/strain curves of dipped cords of the present invention compared to other cord construction.

FIG. 6 shows stress-strain curves of different cords after being dipped (and subsequently dried) in an RFL bath. Such dipping is well known to the man skilled in the art and has as main object to improve adherence of the cords to the rubbery material. The abscissa show the elongation in percent of the cords length on the X ordinate whereon loads are applied as more specifically represented on the Y ordinate in Newton. Represented is the behavior of the competitor cord 72, hybrid cord 74, an aramid cord 73 and merged cord 1, 21, 51, 61 or 71 of the preferred embodiment of the invention. It can be seen that the competitor cord 73 and the hybrid cord 74 are almost aligned at low stresses of 400 N or less yielding about 8% elongation. The aramid cords yielding about 4% elongation at low stress amplifies the problems in using aramid cords in shaping a green tire due to a lack of extensibility. More interesting is the very high extensibility achieved by the preferred embodiment cord 1, 21, 51 or 61 of almost 12% at stress of 400N. Put in other words, at low applied forces, the expansion potential of the merged and high energy cords is substantial. This feature allows an easy shaping of the green tire on the tire building drum and subsequently in the mold. It is to be noted that aramid cords have (also) a high resistance to elongation at low elongations; this could become problematic during the manufacturing of the tire. The manufacturing and dipping steps of the cords and the subsequent tire building must be tightly controlled in order to avoid losing too much of the elongation potential of the aramid cords. The aramid cords 73 used in the graphs and for comparison in the example below are as described in European patent application 412 928.

FIG. 7 shows stress-strain curves of different greige cords after twisting and prior to dipping. As on FIG. 6 the abscissa show the elongation in percent of the cords whereon loads are applied which are represented on the Y ordinate in Newton. Represented are, as in FIG. 6, the behavior of aramid cords—reference 73—, competitor cords—reference 72—, hybrid cords—reference 74—and merged cords—reference 1, 21, 51, 61 or 71—. It appears that the stress-strain curves of the cords for the claimed merged cords after dipping yields the highest elongation capability but prior to dipping the greige merged cords 1,21,51,61 or 71 has lower elongation capabilities. This was unexpected that low tension processing in combination with this merge cord construction would yield this high extensibility property. The merged cord of the present invention achieved about 30% improvement over its greige cord results, anything 20% or over is remarkable.

In tests the competitor cord 72 of 3300/2/1880/1 twisted at 5.8/5.8/5.8 showed mid LASE, lowest elongation equal strength relative to the hybrid cord 74 and the merged cord 1, 21, 51, 61 or 71; the cord 72 being superior to the aramid cord 73. The hybrid cord 74 had the highest LASE, mid elongation and equal strength, but retained only 75% of the tensile strength post cure. The merged cord 1, 21, 51, 61 or 71 of the present invention had lowest LASE, highest elongation and equal strength, but also retained 93% of the tensile strength post cure as compared to the competitions 83%.

The physical properties of the cords tested are summarized in table 1, table 2 and table 3 as shown below. It is understood that the adhesive subcoat 3100C or 3110C and topcoat 2550Care proprietary adhesives of the Goodyear Tire and Rubber Company, each tire manufacturer has its own adhesive subcoats, plycoats and formulated compounds suitable for this application, some better than others. For this invention the important factor is that all comparative tests use the same adhesives.

TABLE 1

Greige Cord Physical Properties

| Sample ID<br>S41_4556 | Competitor<br>Cord 72 | Merge Cord<br>1, 21, 51, 61, 71 | Hybrid<br>Cord 74 |
|---|---|---|---|
| Material Type | Aramid K29/<br>Nylon 66 | Aramid K29/<br>Nylon 66 | Aramid K29/<br>Nylon 66 |
| Construction Aramid | 3300/2 | 3300/2 | 3300/3 |
| Construction Nylon | 1880/1 | 1880/1 | 940/1 |
| TWIST, TPI | 5.8/5.8/5.8 | 6.7/4.5/6.7 | 7/0/7 |
| Tensile Properties | D Jaws | D Jaws | D Jaws |
| 3% LASE, N | 101 | 55.1 | 32.9 |
| Break Str, N | 1234 | 1123 | 1249 |
| Elong @ Brk, % | 10.6 | 14.4 | 16.1 |
| Gauge, mils | 42 | 45 | 55 |
| Linear Density, dtex | 9392 | 9637 | 13143 |

TABLE 2

Dipped Cord Physical Properties

| Sample ID<br>S41_4556 | Competitor<br>Cord 72 | Merge Cord<br>1, 21, 51, 61, 71 | Hybrid<br>Cord 74 |
|---|---|---|---|
| Adhesive Subcoat | 3100C or 3110C | 3100C or 3110C | 3100C or 3110C |
| Adhesive Topcoat | 2055C | 2055C | 2055C |
| Processing Net Stretch | −1.2% | −1.8% | 0.4% |
| Tensile Properties | | | |
| 3% LASE, N | 70.2 | 48.6 | 85.6 |
| Break Str, N | 1182 | 1109 | 1170 |
| Elong @ Brk, % | 12.8 | 18.3 | 14.7 |
| Gauge, mils | 49 | 52 | 57 |
| Linear Density, dtex | 9947 | 10356 | 13480 |

TABLE 3

Dipped Cord Composite Test Results

| Property | Competitor Cord 72 | Merge Cord 1, 21, 51, 61, 71 | Hybrid Cord 74 |
|---|---|---|---|
| Hot U, F2261, N | 238 | 232 | 222 |
| Static Strip, N | | | |
| F2261 18'/310F | 266 | 294 | 308 |
| Dyn Flex, 170F | | | |
| Tensile, N | | | |
| Unflexed | 1036 | 1036 | 1132 |
| Flexed | 862 | 964 | 858 |
| % Retained | 83.2 | 93.5 | 75.8 |
| Adhesion, N | | | |
| Unflexed | 296 | 274 | 275 |
| Flexed | 288 | 261 | 266 |
| % Retained | 97.4 | 95.0 | 96.7 |
| Dyn Flex, RT | | | |
| Tensile, N | | | |
| Unflexed | 1056 | 1016 | 1114 |
| Flexed | 958 | 998 | 889 |
| % Retained | 91.1 | 98.2 | 79.8 |
| Adhesion, N | | | |
| Unflexed | 317 | 288 | 280 |
| Flexed | 309 | 279 | 265 |
| % Retained | 97.4 | 96.9 | 94.6 |

The Dynamic Flex Test comprises of two layers of cord immersed in a rubber matrix Cords are parallel and placed at 14 EPI loaded axially and cycled tension to compression at 37,500 cycles over a two and one half hour period. The composite is pealed to get the dynamic flex adhesion and then extended to get the retained tensiles, this is commonly referred to as the "Shoe Shine Test".

A method of manufacturing a merged cord 1, 21, 51, 61 or 71 includes the steps of: constructing a merged cord of two plies of aromatic polyamide and one ply of aliphatic polyamide having a greige low elongation capability in the range of 6% to 15% and a dipped high elongation at least 20% higher than the value of the greige merged cord, wherein the greige merged cord has a percent elongation of 10% to 15%.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire for use on aircraft having a radial carcass, a crown reinforcement and a tread; the crown reinforcement comprising one or more ply layers or strips reinforced by cords oriented relative to the circumferential direction at an angle of between 0° and 35° with respect to the equatorial plane of the tire and wherein at least one ply layer or strip has merged cords having greige cord properties of a percent elongation at break of 14% to less than 16% and a break strength greater than 1050 N with a linear density of greater than 9,500 dtex.

2. The pneumatic tire of claim 1 wherein the merged cords are constructed by helically twisting together at least one aromatic polyamide yarn and at least one nylon yarn.

3. The pneumatic tire of claim 2 wherein the at least one aromatic polyamide yarn is two 3300 dtex aromatic polyamide yarns.

4. The pneumatic tire of claim 3 wherein the at least one nylon yarn is a single 1880 dtex nylon yarn.

5. The pneumatic tire of claim 4 wherein the twist of each aromatic polyamide yarn is 6.7 turns per inch (TPI), the twist of the nylon yarn is 4.5 TPI, and the cord twist is 6.7 TPI.

* * * * *